United States Patent
Fawcett et al.

(10) Patent No.: US 11,650,858 B2
(45) Date of Patent: May 16, 2023

(54) MAINTAINING STREAM PROCESSING RESOURCE TYPE VERSIONS IN STREAM PROCESSING

(71) Applicant: International Business Machines Corporation, Armonk, NY (US)

(72) Inventors: Bradley William Fawcett, Byron, MN (US); Jingdong Sun, Rochester, MN (US); Henry Chiu, San Jose, CA (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 17/031,086

(22) Filed: Sep. 24, 2020

(65) Prior Publication Data

US 2022/0091904 A1 Mar. 24, 2022

(51) Int. Cl.
*G06F 9/50* (2006.01)
*G06F 16/23* (2019.01)
*G06F 9/48* (2006.01)
*G06Q 10/0631* (2023.01)

(52) U.S. Cl.
CPC .......... *G06F 9/5083* (2013.01); *G06F 9/4881* (2013.01); *G06F 16/2379* (2019.01); *G06Q 10/06312* (2013.01)

(58) Field of Classification Search
None
See application file for complete search history.

(56) References Cited

U.S. PATENT DOCUMENTS

| 8,276,121 | B2 | 9/2012 | Miller |
| 8,745,012 | B2 | 6/2014 | Rusher |
| 9,542,221 | B2 | 1/2017 | Harris |
| 9,659,185 | B2 | 5/2017 | Elovici |

(Continued)

FOREIGN PATENT DOCUMENTS

WO 2019133928 A1 7/2019

OTHER PUBLICATIONS

Fernandez et al., "Integrating Scale Out and Fault Tolerance in Stream Processing using Operator State Management", Jun. 2013, In Proceedings of the 2013 ACM SIGMOD international conference on Management of data, pp. 725-736.

(Continued)

*Primary Examiner* — Adam Lee
(74) *Attorney, Agent, or Firm* — Aaron Pontikos

(57) ABSTRACT

A method for maintaining version consistency of resources. The method provides for one or more processors to receive a submitted request to run a job in which the job includes a processing element and a timestamp associated with running the job. Identification of a resource type associated with the processing element is determined, based on a tag included in the job, associated with the processing element. A version of the resource type of the processing element is determined, based on a mapping of the tag associated with the identified resource type and the timestamp of the job. The resource type of the determined version is requested from a resource manager, and responsive to a confirmation of assigning the version of the resource type from the resource manager, the process element of the job is performed on the version of the resource type assigned by the resource manager.

20 Claims, 4 Drawing Sheets

(56) References Cited

U.S. PATENT DOCUMENTS

| | | | |
|---|---|---|---|
| 10,558,501 B2 | 2/2020 | Bradshaw | |
| 11,175,950 B1* | 11/2021 | Yang | G06F 9/3838 |
| 11,372,689 B1* | 6/2022 | Allen | G06F 9/4887 |
| 2008/0168130 A1* | 7/2008 | Chen | G06F 11/3419 |
| | | | 709/203 |
| 2011/0231457 A1* | 9/2011 | Tager | G06F 16/217 |
| | | | 707/825 |
| 2012/0158646 A1* | 6/2012 | Shafiee | G06Q 10/06312 |
| | | | 707/607 |
| 2014/0282582 A1* | 9/2014 | Clark | G06F 9/5038 |
| | | | 718/104 |
| 2015/0199214 A1 | 7/2015 | Lee | |
| 2015/0365342 A1* | 12/2015 | McCormack | H04L 41/0896 |
| | | | 709/224 |
| 2017/0097851 A1* | 4/2017 | Chen | G06F 9/45558 |
| 2017/0357532 A1* | 12/2017 | Miraftabzadeh | H04L 41/40 |
| 2020/0026560 A1* | 1/2020 | Singh | G06F 9/5083 |

OTHER PUBLICATIONS

Gedik et al., "Elastic Scaling for Data Stream Processing", IEEE Transactions on Parallel and Distributed Systems, 25 (6), 1447-1463, Dec. 2013.

Koller et al., "Probabilistic Graphical Models: Principles and Techniques", The MIT Press, 16 pps., 2009.

Liu et al., "D-storm: Dynamic Resource-Efficient Scheduling of Stream Processing Applications", Dec. 2017, In 2017 IEEE 23rd International Conference on Parallel and Distributed Systems (ICPADS), pp. 485-492, IEEE.

* cited by examiner

|  | RESOURCE TYPE | | | |
|---|---|---|---|---|
| VERSIONING TIME | RED RESOURCE | WHITE RESOURCE | BLUE RESOURCE | ... |
|  |  |  |  |  |
| T - 0 | RED_V1.DEFN | WHITE_V1.DEFN | BLUE_V1.DEFN |  |
| T - 0.5 |  |  |  |  |
| T - 1 | RED_V2.DEFN |  |  |  |
| T - 1.5 |  |  |  |  |
| T - 2 | RED_V3.DEFN | WHITE_V2.DEFN |  |  |
| T - 2.5 |  |  |  |  |
| T - 3 |  |  | BLUE_V2.DEFN |  |
| T - 3.5 |  |  |  |  |

FIG. 2

MAINTAINING STREAM PROCESSING RESOURCE TYPE VERSIONS IN STREAM PROCESSING

FIELD OF THE INVENTION

The present invention relates generally to the field of data analytics and more particularly to maintaining consistency of resource versions in-stream processing of big data volumes.

BACKGROUND OF THE INVENTION

Data processing results have developed as integral dependencies in multiple fields such as consumer business, research, healthcare, and financial transactions, to name a few. Traditional processing of large volumes of data have been grouped into batch processing, which is often scheduled, requires significant time to complete, and includes latency of results from data input, which can have an impact on the response time of decisions and actions.

An alternative to batch processing is stream processing, which enables continuous processing of data input in near-real-time. Results from stream processing of big data enable analytic tools to respond also in near-real-time. Events that require quick awareness or response, such as fraud detection, benefit from stream processing.

Stream processing includes applications that are referred to as "jobs" when in run mode and include processing elements (PEs), which are processes that perform specific operations and require specific resources to perform the operations. Some stream processing jobs may run and complete in minutes, whereas other jobs may continue processing for hours, days, or extended periods of time.

SUMMARY

Embodiments of the present invention disclose a method, computer program product, and system. The embodiments include a method for maintaining version consistency of resources. The method provides for one or more processors receiving a submitted request to run a job in which the job includes a processing element and a timestamp associated with running the job. The one or more processors determine an identification of a resource type associated with the processing element, based on a tag included in the job, associated with the processing element. The one or more processors determine a version of the resource type of the processing element. based on a mapping of the tag associated with the identified resource type and the timestamp of the job. The one or more processors request the resource type of the determined version from a resource manager, and responsive to confirmation of assigning the version of the resource type from the resource manager, the one or more processors performing the process element of the job on the version of the resource type assigned by the resource manager.

BRIEF DESCRIPTION OF THE SEVERAL VIEWS OF THE DRAWINGS

FIG. 2 depicts an example set of resource type version information based on versioning time, in accordance with an embodiment of the present invention.

DETAILED DESCRIPTION

Figure 1:
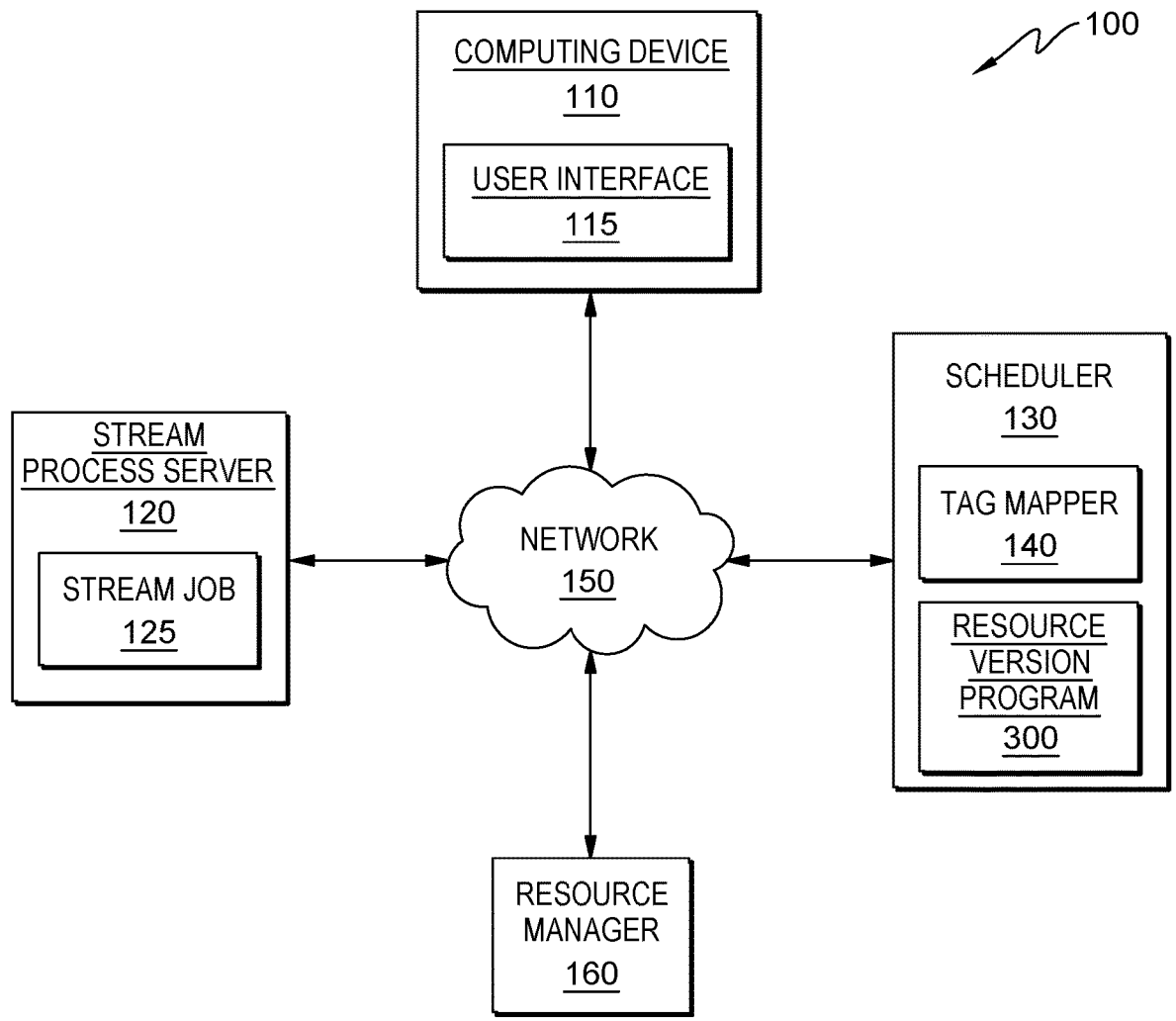
FIG. 1 is a functional block diagram illustrating a distributed data processing environment, in accordance with an embodiment of the present invention.

Embodiments of the present invention recognize stream computing as a form of distributed computing in which functions or operators are spread across one or more resources. The functions perform a type of processing operation of live data in near real-time and may pass the data to a subsequent function or operator in a stream graph. Stream process operators run within processes called processing elements (PEs). An application consists of one or more operators in one or more PEs and in many cases and applications may run for long periods of time (e.g., days, months, or even years).

Processing elements, or PEs, define the resource type required for the execution of the function or operators, typically by a tagging schema. Resource types may include specific hardware, libraries, and application programming interfaces (APIs). A stream application submits PEs to a scheduler that determines resource type requirements and requests the resource type from a resource manager. Available resources are assigned to perform PE specific operations. Tagging is one implementation used where the resources are labeled with tags and the schedulers are aware of the tags and places PEs properly. Resource types may be shared by multiple jobs, and include, but are not limited to processing characteristics, number of cores, memory, code images, libraries, and infrastructure modules for PE execution & communication.

Embodiments of the present invention recognize that over time, upgrades to resources and corresponding resource type definitions may be required. Examples of upgrades may include fix packs for code image libraries, number of processing cores, memory allocation and limits, and processing characteristics. Resource types used by a PE in a single job communicate via infrastructure modules for job performance, reliability, and consistency in PE sequence and execution.

Embodiments recognize that applications submitted to run (e.g., jobs) should be immune to resource type changes and not require application changes, for example having to change tagging specifications due to an underlying resource type change. Replacing a resource-type definition with a new definition works initially where new jobs use a new definition and existing jobs use an old definition. However, problematic events can occur, such as a case in which a resource fails in a job running older PEs or from disruption of processing by other causes, and the failed resource is replaced with a resource with an upgraded resource-type definition. The replacement resource may exhibit compatibility issues and communication failures with the other older PEs of the job running on older resource type definitions. In another problematic situation in which a new job is submitted for processing; however, new upgraded resource type definitions are not available. The resource manager assigns PEs of the new job to share resources from previous jobs that are running, which possibly results in new resource type definitions mixed with older resource type definitions.

Embodiments of the present invention recognize that the mix of new and older resource type definitions may result in incompatibility issues and communication failure between PEs.

Embodiments of the present invention provide a method, computer program product, and computer system for aligning versioning of resource type definitions of processing elements of a job with a timestamp associated with executing the job. Embodiments include tagging to identify resource types required by PEs, and a tag mapper component that determines a particular resource type definition that corresponds to a respective PE based on a timestamp associated with the PE for a given job. In some embodiments, an initial resource-type definition is given a default designation. In some embodiments of the present invention the designation of a new version of a resource type assumes the next designation in a sequence (e.g., previous version "n", new version "n+1").

For example, using colors for clarity as generic labels of resources, a resource type "RED" may have a default definition of "RED-v1.defn", indicating a first version (the designation could be "0", "A", or other characters that imply a logical sequence that advances). In some embodiments, an upgrade to the resource type "RED" would involve the upgrade assuming the next designation in the version sequence of the resource type. For example, an upgraded resource type "RED" is designated as "RED-v2.defn" and is associated with a versioning time of T2, and the previous version type remains as "RED-v1.defn" and is associated with the versioning time T1. Tag mapper 140 can use the versioning time to determine the appropriate version of a resource type of a job, based on comparing the timestamp of the job to the versioning time of the versions of the resource type.

In embodiments of the present invention, assignment, or replacement of a resource type is based on the identification of the appropriate version of the resource type definition corresponding to the timestamp of the running job. The scheduler receives the version information for each of the resources required by the PEs of the job, and submits requests for the version-matching resources from the resource manager.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations concerning the environments in which different embodiments may be implemented. Many modifications to the depicted environment may be made by those skilled in the art without departing from the scope of the invention as recited by the claims.

Distributed data processing environment 100 includes computing device 110, stream process server 120, scheduler 130, and resource manager 160, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communications between computing device 110, stream process server 120, scheduler 130, and resource manager 160, in accordance with embodiments of the present invention.

Computing device 110 is a user device capable of performing programmable operations and communicating with other devices of distributed data processing environment 100. Computing device 110 includes user interface 115 and submits requests to run stream process applications to stream process server 120. Computing device 110 communicates via network 150 to stream process server 120.

In some embodiments, computing device 110 may be a server computer, a laptop computer, a tablet computer, a smartphone, smartwatch, a wearable computing device, or any programmable electronic mobile device capable of communicating with various components and devices within distributed data processing environment 100, via network 150. In another embodiment, computing device 110 represents a computing system utilizing clustered computers and components (e.g., database server computers, application server computers, etc.) that act as a single pool of seamless resources when accessed within distributed data processing environment 100. In general, computing device 110 represents one or more programmable electronic devices or a combination of programmable electronic devices capable of executing machine-readable program instructions and communicating with stream process server 120, via network 150. Computing device 110 may include internal and external hardware components, depicted in more detail in FIG. 4.

User interface 115 provides an interface to access the features and functions of computing device 110. In some embodiments of the present invention, user interface 115 provides access to submit an application for processing to stream process server 120, and may also support access to other applications, features, and functions of computing device 110 (not shown). In some embodiments, user interface 115 provides display output and input functions for computing device 110.

User interface 115 supports access to alerts, notifications, and provides access to forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of computing device 110. User interface 115 enables respective users of computing device 110 to receive, view, hear, and respond to input, access applications, display content of online conversational exchanges, and perform available functions.

Stream process server 120 is a server computing device capable of performing stream processing of application submitted by user-clients. Stream process server 120 is depicted as including stream job 125. Stream process server 120 communicates with computing device 110 via network 150, receiving application processing requests and in some cases, sending output data. In some embodiments, stream process server 120 communicates with scheduler 130, submitting PEs of a job for identification and scheduling of resources. In some embodiments, scheduler 130 is a component of stream process server 120 (not shown). In other embodiments, scheduler 130 is external to stream process server 120 but communicatively connected via network 150. In some embodiments, resource manager 160 is a component of stream process server 120 (not shown).

In some embodiments, stream process server 120 can be a web server, a blade server, a desktop computer, a laptop computer, a tablet computer, a netbook computer, or any other programmable electronic computing device capable of receiving, sending, and processing data, and communicating with features and functions of computing device 110, scheduler 130, resource version program 300 via scheduler 130, and resource manager 160, via network 150. In another embodiment, Stream process server 120 represents a computing system utilizing clustered computers and components (e.g., database server computers, application server computers, etc.) that act as a single pool of seamless resources when accessed within distributed data processing environment 100. Stream process server 120 may include internal and external hardware components, as depicted in detail and described in FIG. 4.

Stream job 125 is an application submitted by computing device 110 via network 150, to run as a job on-stream process server 120. Stream job 125 includes one or more processing elements (PEs) that include tags for resources to perform operator tasks of the one or more respective PEs.

Scheduler 130 is a component of stream processing associated with stream process server 120. Scheduler 130 receives a job from stream process server 120 that includes one or more PEs having tags associated with resource types required to perform the operator tasks of the respective PEs, and timestamp of receipt of the request to run the job. Scheduler 130 determines the tags associated with the PE resource types and submits the tags and timestamp to tag mapper 140. Scheduler 130 receives a version of the resource type definition associated with the respective PE tags and job timestamp from tag mapper 140 and submits the resource type definition version to resource manager 160 to acquire and assign resources to the respective PEs of the job. In some embodiments, scheduler 130 is included as an internal operational component of stream process server 120 (not shown). In other embodiments, scheduler 130 external to stream process server 120 and is communicatively connected to stream process server 120 via network 150.

Tag mapper 140 is depicted as included within scheduler 130. Tag mapper 140 contains information associating a job timestamp and PE resource type tags with particular versions of the resource types. In some embodiments, tag mapper 140 identifies the version of a resource type definition corresponding to a tag and timestamp of a particular job PE and provides the identification to scheduler 130. In some embodiments, tag mapper 140 is manually updated by an administrative-role user to add and/or update resource type tag version information corresponding to a version change timeframe. In some embodiments, a new version of a resource type assumes the version identity of the previous version, for example, a new version of resource type "RED" assumes the previous version of RED: RED_v1.defn and the previous version assumes a "next" version as in "n+1, such that the previous version would become RED_v2.defn. For the case in which RED_v2.defn already existed, the version 2 resource type would be changed to RED_v3.defn, and so on. A person of ordinary skill in the art would recognize that other approaches to distinguishing versions of a resource type definition are possible without departing from the concepts included in the embodiments of the present invention expressed herein.

Resource version program 300 operates in conjunction with scheduler 130. Resource version program 300 acquires a timestamp of the receipt of an application to be run as a job and identification of one or more PEs, each of which includes operators to perform functions on data and a tag associated with a resource type required to perform the operators. Resource version program 300 utilizes the timestamp of the job and the resource type tag of the PEs to determine the appropriate version of the resource type definition for the respective PEs from the versioning information included in the tag mapper. Resource version program 300 submits requests for the determined resource-type definition of the respective PEs to a resource manager and receives an assignment of an available resource having the appropriate version of the resource type definition for the respective PEs of the submitted job.

In some embodiments, resource version program 300 determines the provisioning of a new version of a resource type definition, based on the entry of resource version information in tag mapper 140. Resource version program 300 determines a time (i.e., date and timestamp) associated with the provisioning of the new version and associates the new definition of the resource type with a new or next version and the time of provisioning. Resource version program 300 includes the time of provisioning, also referred to in FIG. 2 as "versioning time", and new version information, in tag mapper 140.

In some embodiments of the present invention, if the resource type definition required is not available, then resource version program 300 requests resource manager 160 to identify an in-use resource with a matching resource-type definition to share with the respective PE of the submitted job.

Resource manager 160 is a component of stream processing operations. Resource manager 160 receives a request for resources from schedule 130 including the version of respective resource type definitions for each PE to be run for a submitted job. Resource manager 160 identifies available resources matching the resource type and definition and assigns the respective resource types to the corresponding PEs. In some embodiments, resource manager 160 responds to a lack of an available resource type with the appropriate definition to assign to a PE of the job by assigning a shared resource matching the resource type and definition requested.

FIG. 2. depicts resource version information 200, which includes example sets of resource type version information based on versioning time. FIG. 2 includes rows 210, 215, 220, 225, 230, 235, 240, and 240. The enumerated rows of FIG. 2 include a versioning time reference and resource types depicted in columns. The rows of resource version information 200 provide example scenarios in which embodiments of the present invention determine consistent versions of resource type definitions for the resources of jobs submitted within respective timestamp ranges.

In an example embodiment of the present invention, three resource types, RED resource type, WHITE resource type, and BLUE resource type, are provisioned for performing operators of stream process applications at versioning time T-0. The information associated with the resource type version at T-0 is included in row 210. The versions of the resource types provisioned at versioning time T-0 are established as version 1: RED_V1.DEFN; WHITE_V1.DEFN; and BLUE_V1.DEFN.

Row 215 includes versioning time T-0.5 which represents a time range subsequent to T-0 and prior to T-1. PEs of jobs received during versioning time T-0.5 that require one or a combination of RED, WHITE, and BLUE resource types, as identified by resource tags included in the respective PEs, are determined to correspond to version 1 resource type definitions for the respective resource type, based on a timestamp subsequent to T-0 and prior to T-1.

Row 220 includes versioning time T-1 and indicates an update made to the RED resource type. The update is identified as a version 2 definition of the RED resource type, as illustrated by "RED_V2.DEFN". Row 220 also indicates that the WHITE and BLUE resource types at versioning time T-1 continue to correspond to version 1 resource type definitions.

Row 225 includes versioning time T-1.5 which represents a time range subsequent to versioning time T-1 and prior to versioning time T-2. PEs of jobs received with a timestamp within the versioning time range T-1.5 that require a RED resource type, as identified by resource tags included in the respective PEs, are determined to correspond to version 2 resource type definitions for the RED resource type, based on a timestamp at or subsequent to versioning time T-1 and prior to versioning time T-2. One or a combination of WHITE and BLUE resource types required by PEs of jobs received with a timestamp within the versioning time range T-1.5 correspond to version 1 of the respective resource types.

Row 230 includes versioning time T-2 and indicates an update that has been made to the RED resource type and the WHITE resource type. The update is identified as a version 3 definition of the RED resource type, as illustrated by "RED_V3.DEFN", and a version 2 definition of the WHITE resource type, as illustrated by "WHITE_V2.DEFN. Row 230 also indicates that no update has been made to the BLUE resource type, which remains at version 1 and is illustrated by "BLUE_V1.DEFN".

Row 235 includes versioning time T-2.5, which represents a time range subsequent to versioning time T-2 and prior to versioning time T-3. PEs of jobs received with a timestamp corresponding to the versioning time range T-2.5 that require a RED resource type, as identified by resource tags included in the respective PEs, are determined to correspond to version 3 as illustrated by "RED_V3.DEFN". Identifying the resource type definition for the RED resource type as corresponding to version 3 is based on the timestamp at or subsequent to versioning time T-2 and prior to versioning time T-3. WHITE resource types required by PEs of jobs received with a timestamp corresponding to the versioning time range T-2.5 are determined to correspond to version 2 of the WHITE resource type as illustrated by the update "WHITE_V2.DEFN" made at versioning time T-2. BLUE resource types required by PEs of jobs received with a timestamp corresponding to the versioning time range T-2.5 correspond to version 1 of the BLUE resource type.

Row 240 includes versioning time T-3 and indicates an update that has been made to the BLUE resource type. The update is identified as a version 2 definition of the BLUE resource type, as illustrated in row 240 by "BLUE_V2.DEFN". Row 240 also indicates that no additional updates have been made to the RED or WHITE resource types, which remains at version 3 and version 2 respectively.

Row 245 includes versioning time T-3.5 which represents a time range subsequent to versioning time T-3 and prior to a subsequent versioning time, (not shown). PEs of jobs received with a timestamp corresponding to the versioning time range T-3.5 that require a RED resource type, as identified by resource tags included in the respective PEs, are determined to correspond to version 3 as illustrated by the most recent update of "RED_V3.DEFN" made at versioning time T-2. WHITE resource types required by PEs of jobs received with a timestamp corresponding to the versioning time range T-3.5 are determined to correspond to version 2 of the WHITE resource type as illustrated by the most recent resource definition update "WHITE_V2.DEFN" made at versioning time T-2. BLUE resource types required by PEs of jobs received with a timestamp corresponding to the versioning time range T-3.5 correspond to version 2 of the BLUE resource type. Identifying the resource type definition for the RED resource type as corresponding to version 3, WHITE resource type corresponding to version 2, and BLUE resource type corresponding to version 2 is based on the timestamp at or subsequent to versioning time T-3 and prior to the subsequent versioning time (not shown).

Figure 3:
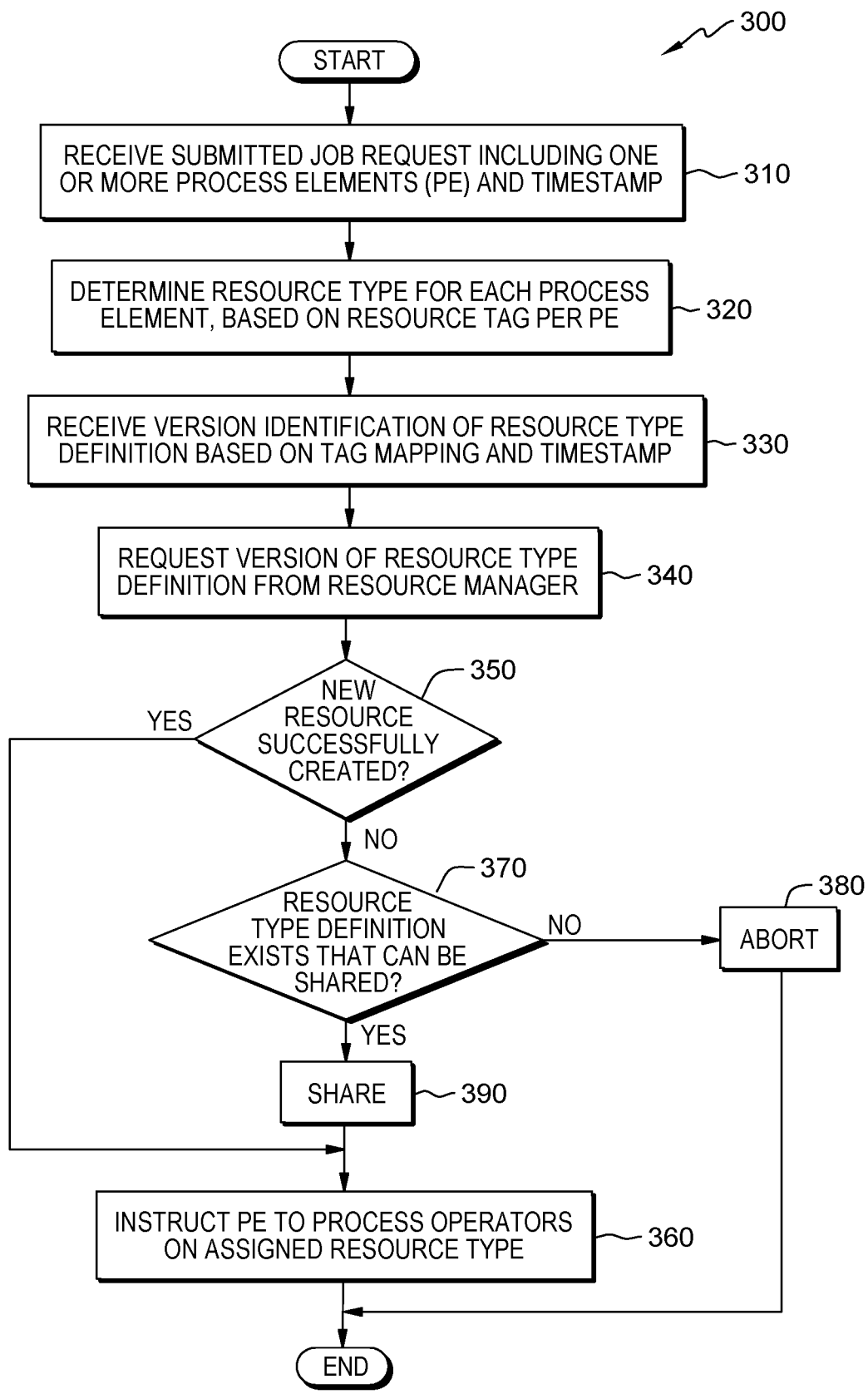
FIG. 3 is a flowchart depicting operational steps of a resource version program, operating in the distributed data processing environment of FIG. 1, in accordance with embodiments of the present invention.

FIG. 3 is a flowchart depicting the operational steps of one embodiment of resource version program 300. In embodiments of the present invention, resource version program 300 determines the correct version of a resource type definition for PEs of jobs submitted to a stream process based on a timestamp associated with the submitted job. In some embodiments, the timestamp corresponds to the submission and receipt of a customer application to be run as a job. In some embodiments in which a dedicated resource having the appropriate version of a resource type definition is not available, resource version program 300 indicates acceptance of a shared resource of the appropriate version.

Resource version program 300 receives a submitted job request including one or more process elements (PEs) and a timestamp (step 310). In some embodiments of the present invention, resource version program 300 operates within a scheduler component of a stream processing computing device or stream processing system. In some embodiments, resource version program 300 receives information associated with a submitted application to execute as a stream processing job. Resource version program 300 determines one or more PEs included in the job and determines the timestamp associated with the receipt and processing of the submitted job.

For example, resource version program 300 receives an application submitted from computing device 110 by a user to scheduler 130. Resource version program 300 determines a timestamp associated with the receipt and processing of the received application to be run as a job. Resource version program 300 identifies one or more PEs included in the job.

Resource version program 300 determines resource type for each processing element, based on a resource tag of respective PEs (step 320). In some embodiments of the present invention, having received a submitted application to be run as a stream process job, and determined the PEs associated with the job, resource version program 300 examines the PEs and determines the resource type identified for each PE, based on a tag associated with each PE of the job. A PE includes a tag that specifies the type of resource required to perform the operators of the PE.

For example, having received the submitted job and identifying the timestamp associated with the job and the one or more PEs, resource version program 300 identifies a tag associated with a PE, respectively, and determines the type of resource (resource type) required by the PE to perform the operators associated with the respective PE. In the example, resource version program 300 determines two PEs associated with the received job and determines that the tag associated with the first PE indicates the requirement of a RED type resource. Resource version program 300 examines the tag of the second PE and determines that a resource type of WHITE is required for the second PE.

Resource version program 300 receives a version identification of resource type definition based on tag mapping and the timestamp of the submitted job (step 330). In some embodiments of the present invention, resource version program 300 submits the timestamp of the job and the resource type of each respective PE of the job to a tag mapper component. The tag mapper component includes information regarding a version of a respective resource type to be used by a PE based on the timestamp of the submitted job. Based on the timestamp associated with the job, resource version program 300 receives the version identification of a resource type definition for the resource type indicated by the tag included in respective PEs of the job. The resource type definition includes the details of the resource type for the PE to perform operations and successfully interact and communicate with other PEs of the job. In some embodiments, the version of the resource type definition enables a resource manager to source the appropriate resource for PE performance of operators and functions of the job. In other embodiments, the version of the resource type definition includes the details and information for a resource manager to create a resource meeting the requirements of the respective PE of the job.

For example, resource version program 300 submits the job timestamp and the resource type tag associated with respective PEs of the one or more PEs of the submitted job to a tag mapper component. The tag mapper includes information associated with the specific versions of the resource type definition of resource types required by PEs. Based on the tag received for a respective PE and the timestamp associated with the job, resource version program 300 receives the version of the resource type definition for each respective PE.

Resource version program 300 requests the version of the resource type definition of the resource for the one or more PEs from a resource manager (step 340). Having received the version of the resource type definition matching the respective PE tags for the job timestamp submitted, resource version program 300 communicates a request for the versions of the resource type definitions for the respective PEs of the submitted job to the resource manager. Resource version program 300 includes the version identification and the resource type in the communication request to the resource manager.

For example, resource version program 300 receives, from the information included in tag mapper 140, the version number of the resource type associated with the first PE of the submitted job, such as version 2 RED resource-type definition. Resource version program 300 communicates with resource manager 160 requesting a RED_V2.defn resource, which corresponds to a RED resource type with a version 2 definition.

Resource version program 300 determines if the version of the resource type definition is created by the resource manager (decision step 350). Resource version program 300 communicates with the resource manager and receives a response indicating whether a resource of the requested resource type definition for the respective PE of the job has been created. For example, in a Kubernetes style of resource management, resources, sometimes referred to as "pods," are created as needed and deleted when no longer required.

For the case in which resource version program 300 receives a response indicating the requested resource type having the requested version has successfully been created (step 350, "YES" branch), resource version program 300 causes the PE of the submitted job to perform processing of operators using the assigned resource type having the requested version resource-type definition (step 360). For example, resource version program 300 communicates a request to resource manager 160 for a RED type resource having a version 2 definition. Resource manager 160 creates a RED_V2.defn resource and responds to resource version program 300 indicating the successful creation of the resource and assignment of the resource to the PE of the submitted job.

For the case in which resource version program 300 receives a response that a resource having the requested version of resource type definition cannot be successfully created (step 350, "NO" branch), resource version program 300 determines whether a resource that can meet the requirements of the requested resource type definition exists and can be shared (decision step 370). Resource version program 300 requests the resource manager to search for an occupied resource matching the resource type definition version requested and instruct the resource manager to respond as to whether a resource with a resource type definition that meets the requirements of the requested resource exists and can be shared.

For the case in which resource version program 300 determines from the resource manager response that a resource meeting the requirements of the requested resource version resource-type definition that can be shared with the PE exists (step 370, "YES" branch), resource version program 300 provides an identification of the resource that can be shared, with the PE of the submitted job (step 390). Having identified the resource to share, resource version program 300 causes the PE of the submitted job to process operators using the assigned resource to be shared (step 360), and resource version program 300 ends.

For example, resource version program 300 receives a communication from resource manager 160 that a resource of version and resource type matching the requested resource cannot be successfully created (e.g., lack of CPU's having a required number of cores). Resource version program 300 requests resource manager 160 to locate a resource that can meet the requirements of the resource type definition and can be shared with the PE of the job that requires the requested resource type and version definition. Resource version program 300 receives a response from resource manager 160 that includes identification of a resource that meets the requirements of the requested resource type and version definition, and assignment of the identified resource to the respective PE of the submitted job requiring the requested version of the resource type. Resource version program 300 provides instruction causing the PE of the submitted job to process operators using the assigned resource that can be shared.

For the case in which resource version program 300 receives a response from the resource manager indicating a resource-type definition does not exist that can be shared (step 370, "NO" branch), resource version program 300 aborts the operation, the submitted job fails, and resource version program 300 ends.

Resource version program 300, having received identification and assignment of a resource of the requested version and resource type to be shared, instructs the PE of the submitted job to perform processing of operators on the assigned available resource type having the requested version resource-type definition (step 360). Resource version program 300 continues processing of all PEs of the submitted job on resource types having definition versions as determined by the timestamp of the submitted job and the tag associated with respective PEs.

Having completed the processing of all PEs, resource version program 300 ends.

Figure 4:
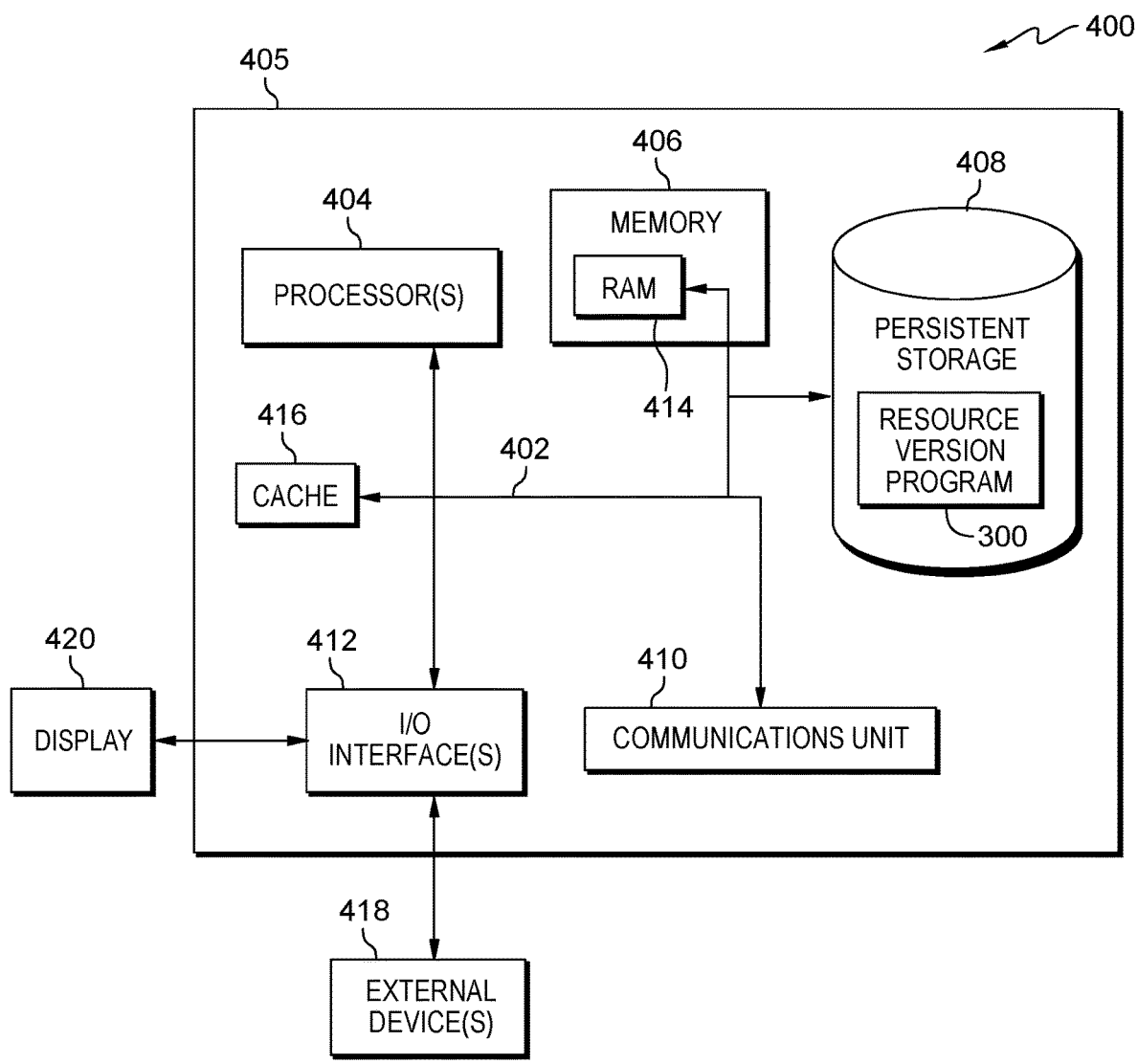
FIG. 4 depicts a block diagram of components of a computing system, including a computing device configured to operationally perform the resource version program of FIG. 3, in accordance with an embodiment of the present invention.

FIG. 4 depicts a block diagram of components of computing system 400, including computing device 405, configured to include or operationally connect to components depicted in FIG. 1, and with the capability to operationally perform resource version program 300 of FIG. 3, in accordance with an embodiment of the present invention.

Computing device 405 includes components and functional capability similar to components of server 120, (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, resource version program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Resource version program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., resource version program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for stream processing applications, the method comprising:
   receiving, by one or more processors, a request to execute a job, wherein the job includes a processing element (PE) and a timestamp of receipt of the request;
   identifying, by the one or more processors, a resource type required for execution of the job based on a tag included in the PE;
   determining, by the one or more processors, a version of the resource type based on a mapping of the tag and the timestamp;
   requesting, by the one or more processors, assignment of a resource of the version of the resource type, by a resource manager, to perform PE specific operations of the job;
   responsive to receiving a confirmation from the resource manager of assignment of the resource of the version of the resource type to the job, creating, by the one or more processors, the resource of the version of the resource type based on the timestamp of the receipt of the request; and
   executing, by the one or more processors, the job to perform the PE specific operations using the created resource of the version of the resource type assigned by the resource manager.

2. The method of claim 1, further comprising:
   responsive to a disruption of the job execution on the resource of the version of the resource type assigned by the resource manager, determining, by the one or more processors, that the version of the resource type assigned is unavailable for continuing execution of the job;
   requesting, by the one or more processors, a re-assignment of the job to a replacement resource of the version of the resource type; and
   in response to receiving confirmation of the re-assignment of the job to the replacement resource of the version of the resource type creating, by the one or more processors, the replacement resource of the version of the resource type; and
   executing, by the one or more processors, the job on the created replacement resource of the version of the resource type.

3. The method of claim 1, further comprising:
   responsive to the resource manager indicating that the version of the resource type that is requested is not available, requesting, by the one or more processors, the resource manager to identify an instance of a resource of the version of the resource type to be shared; and
   responsive to the resource manager confirming the instance of the resource of the version of the resource type to be shared, executing, by the one or more processors, the job by sharing the instance of the resource of the version of the resource type to be shared with another job.

4. The method of claim 1, wherein the tag maps to a resource type definition file maintained in a tag mapper that indicates a version of the resource type associated with the timestamp of the job.

5. The method of claim 1, wherein a default version of the resource type is assigned by the resource manager in an absence of the tag associated with the resource type.

6. The method of claim 1, further comprising:
responsive to a re-versioning of the resource type, mapping, by the one or more processors, a previous version (n) of the resource type to a next version level (n+1) of the resource type; and
mapping, by the one or more processors, the re-versioning of the resource type to a version level of the previous version (n) of the resource type.

7. The method of claim 1, wherein the submitted request to execute the job is received by a scheduler component of a stream processing computing device.

8. The method of claim 1, wherein a definition of the version of the resource type includes detailed requirements of the resource type requested of the resource manager.

9. A computer program product of stream processing applications, the computer program product comprising:
at least one computer-readable storage medium, and program instructions stored on the at least one computer-readable storage medium, the program instructions comprising:
program instructions to receive a request to execute a job, wherein the job includes a processing element (PE) and a timestamp of receipt of the request;
program instructions to identify a resource type required for execution of the job based on a tag included in the PE;
program instructions to determine a version of the resource type based on a mapping of the tag and the timestamp;
program instructions to request from a resource manager, assignment of a resource of the version of the resource type to perform PE specific operations of the job;
responsive to receiving a confirmation from the resource manager of assignment of the resource of the version of the resource type to the job, program instructions to create the resource of the version of the resource type based on the timestamp of the receipt of the request; and
program instructions to execute the job to perform the PE specific operations using the created resource of the version of the resource type assigned by the resource manager.

10. The computer program product of claim 9, further comprising:
responsive to a disruption of the job execution on the resource of the version of the resource type assigned by the resource manager, program instructions to determine the version of the resource type assigned is unavailable for continuing execution of the job;
program instructions to request a re-assignment of the job to a replacement resource of the version of the resource type;
in response to receiving confirmation of the re-assignment of the job to the replacement resource of the version of the resource type, program instructions to the replacement resource of the version of the resource type; and
program instructions to execute the job to perform the PE specific operations using the replacement resource of the version of the resource type.

11. The computer program product of claim 9, further comprising:
responsive to the resource manager indicating that the version of the resource type that is requested is not available, program instructions to request the resource manager to identify an instance of a resource of the version of the resource type to be shared; and
responsive to the resource manager confirming the instance of the resource of the version of the resource type to be shared, program instructions to execute the job by sharing the instance of the resource of the version of the resource type to be shared with another job.

12. The computer program product of claim 9, wherein the tag maps to a resource type definition file maintained in a tag mapper that indicates a version of the resource type associated with the timestamp of the job.

13. The computer program product of claim 9, further comprising:
responsive to a re-versioning of the resource type, program instructions to map a previous version (n) of the resource type to a next version level (n+1) of the resource type; and
program instructions to map the re-versioning of the resource type to a version level of the previous version (n) of the resource type.

14. The computer program product of claim 9, wherein the submitted request to execute the job is received by a scheduler component of a stream processing computing device.

15. A computer system of stream processing applications, the computer system comprising:
one or more computer processors;
at least one computer-readable storage medium, and program instructions stored on the at least one computer-readable storage medium, the program instructions comprising:
program instructions to receive a request to execute a job, wherein the job includes a processing element (PE) and a timestamp of receipt of the request;
program instructions to identify a resource type required for execution of the job, based on a tag included in the PE;
program instructions to determine a version of the resource type based on a mapping of the tag and the timestamp;
program instructions to request from a resource manager, assignment of a resource of the version of the resource type to perform PE specific operations of the job;
responsive to receiving a confirmation from the resource manager of assignment of the resource of the version of the resource type to the job, program instructions to create the resource of the version of the resource type based on the timestamp of the receipt of the request; and
program instructions to execute the job to perform the PE specific operations using the created resource of the version of the resource type assigned by the resource manager.

16. The computer system of claim 15, further comprising:
responsive to a disruption of the job execution on the resource of the version of the resource type assigned by the resource manager, program instructions to determine the version of the resource type assigned is unavailable for continuing execution of the job;
program instructions to request a re-assignment of the job to a replacement resource of the version of the resource type; and
in response to receiving confirmation of the re-assignment of the job to the replacement resource of the version of the resource type, program instructions to create the replacement resource of the version of the resource type; and program instructions to execute the job to perform the PE specific operations using the replacement resource of the version of the resource type.

17. The computer system of claim 15, further comprising:

responsive to the resource manager indicating that the version of the resource type that is requested is not available, program instructions to request the resource manager to identify an instance of a resource of the version of the resource type to be shared; and responsive to the resource manager confirming the instance of the resource of the version of the resource type to be shared, program instructions to execute the job by sharing the instance of the resource of the version of the resource type to be shared with another job.

18. The computer system of claim 15, wherein the tag maps to a resource type definition file maintained in a tag mapper that indicates a version of the resource type associated with the timestamp of the job.

19. The computer system of claim 15, further comprising:

responsive to a re-versioning of the resource type, program instructions to map a previous version (n) of the resource type to a next version level (n+1) of the resource type; and program instructions to map the re-versioning of the resource type to a version level of the previous version (n) of the resource type.

20. The computer system of claim 15, wherein a definition of the version of the resource type includes detailed requirements of the resource type requested of the resource manager.

* * * * *